Oct. 3 1967 T. M. RUNGE 3,345,633
AIRCRAFT PROXIMITY WARNING SYSTEM
Filed Oct. 22, 1965 3 Sheets-Sheet 2

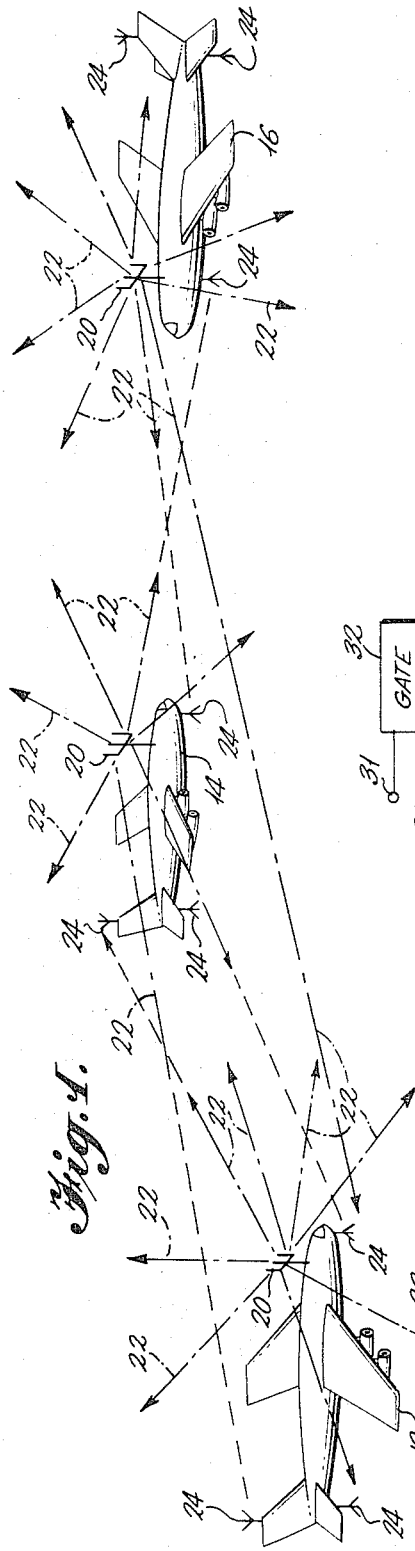

INVENTOR
Thomas M. Runge
BY
ATTORNEY

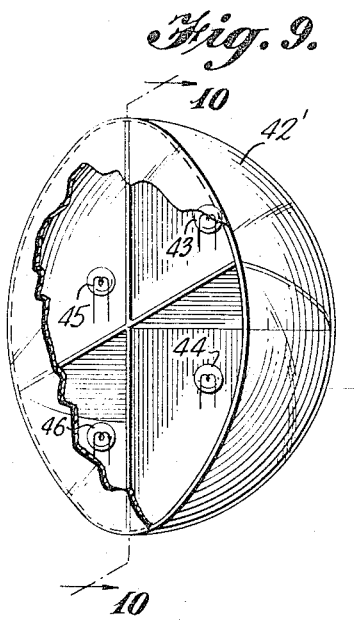
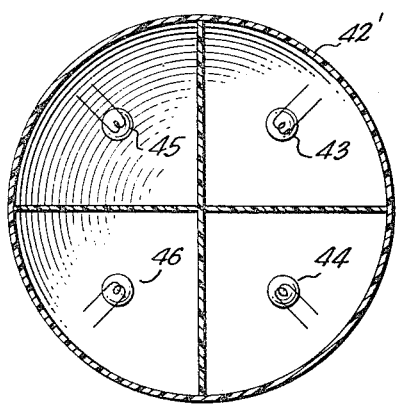
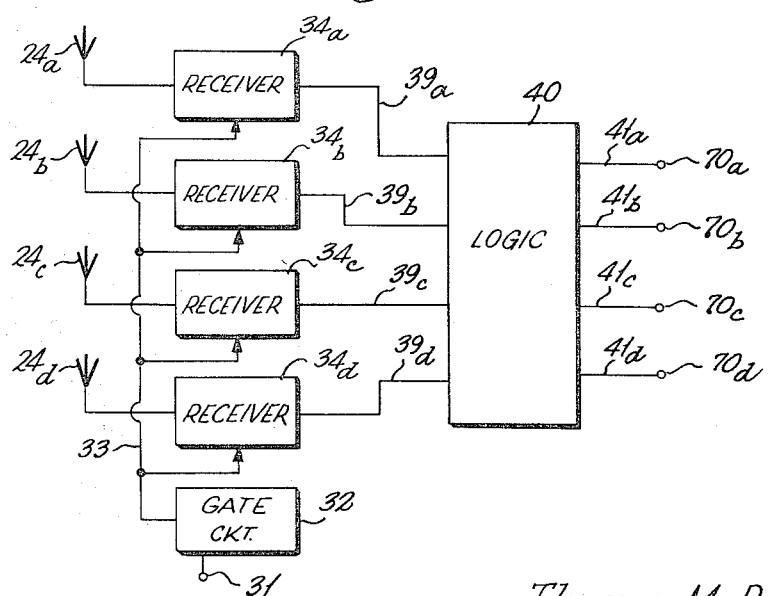

United States Patent Office 3,345,633
Patented Oct. 3, 1967

3,345,633
AIRCRAFT PROXIMITY WARNING SYSTEM
Thomas M. Runge, 5106 Jason, Houston, Tex. 77035
Filed Oct. 22, 1965, Ser. No. 500,716
3 Claims. (Cl. 343—112)

This invention relates to radio detection systems and more particularly to an aircraft proximity warning system for the prevention of collision with and avoidance of other aircraft.

The present invention is described by way of example in connection with its use in aircraft collision protection. It should be mentioned at the outset, however, that the present invention has general application in that the underlying principles of the inventive concept disclosed herein may be used to protect any type of craft which may, from time-to-time, be endangered by immediate or ultimate collision with other craft or obstacles. For instance, while the embodiments of the present invention hereinafter described may be designed to operate for use in aircraft, other embodiments of the subject invention may be designed to operate with respect to surface vessels and submarines. Whereas with respect to aircraft and surface vessels radio frequencies are utilized, a submarine would utilize acoustic signals in the sonic or ultrasonic region of the frequency spectrum.

Accordingly, it is an object of the present invention to provide a new and improved anti-collision detection and warning system which will provide a visual indication of the presence of other aircraft.

It is yet another object of the present invention to provide an aircraft location and general course detector which includes a three dimensional indicator capable of displaying the relative position in space of other aircraft and the distance from the parent aircraft.

It is still another object of the present invention to provide a collision-avoidance system for aircraft in flight which will detect the general location of nearby aircraft and determine the general course of such aircraft and the proximity thereof.

Briefly, the subject invention contemplates the use of a transmitter system and a receiver system in each aircraft with the transmitter system providing pulsed output electromagnetic signal of a predetermined frequency in the UHF range of the frequency spectrum, the receiver system comprising a plurality of receivers with respective antenna means coupled thereto and selectively positioned on the aircraft so as to be able to detect the location in space of a neighboring aircraft transmitting a signal from its respective transmitter system, and a three dimensional indicator coupled to the receivers for providing a visual indication of the relative spatial position or location of neighboring aircraft, said indicator preferably embodying a transparent hollow sphere which is divided into sections, such as octants, with an indicator light located in each octant and coupled to a respective receiver so that the general location of a nearby aircraft is indicated by the lighting of a light in an octant and with the proximity of an aircraft thereto being shown by the light's intensity or rate of blinking.

In the accompanying drawings forming a part of this application and in which like numerals are employed to designate like parts throughout the same, FIGURE 1 is a diagram illustrating generally the mode of operation of the subject invention;

FIGURE 2 is a block diagram illustrative of the transmitter system of the subject invention;

FIGURE 3 is a block diagram of the receiving system of a first embodiment of the subject invention;

FIGURE 8 is a block diagram of a second embodiment of a receiver system utilized in combination with the subject invention;

FIGURE 9 is an illustrative arrangement of a modified three dimensional indicator for use with the receiving system shown in FIGURE 8; and FIGURE 10 is a diagram helpful in understanding the arrangement shown in FIGURE 9.

Figure 4:
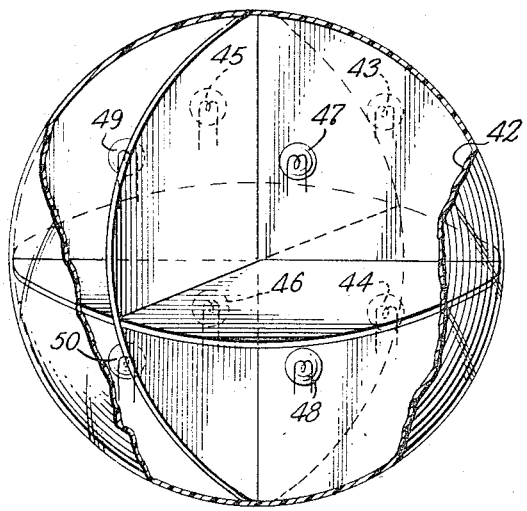
FIGURE 4 shows an arrangement illustrative of a three dimensional indicator utilized in combination with the transmitting and receiving systems of the present invention.

Referring to FIGURE 1, there is shown three aircraft 12, 14 and 16 each having a transmitter system, not shown, including a radiating antenna 20. Each antenna 20, moreover, is adapted to have an omnidirectional radiation pattern in the horizontal plane and radiates energy outwardly in all directions and is illustrated as externally radiated waves 22. In addition, each aircraft is adapted to have a receiving system, not shown, including a plurality of receiving antennas 24 selectively arranged in an array so as to provide directional sensitivity for received signals 22 from one or more radiating antennas 20. The subject invention contemplates having each aircraft equipped with a transmitting and receiving system operable in the UHF region of the frequency spectrum to continuously radiate a pulsed signal, for example, ten microsecond pulses having a repetition rate of one hundred pulses per second on a carrier frequency of fifteen hundred megacycles per second. The receiving system associated with each aircraft in turn will be responsive to the radiated signal from all other aircraft in the vicinity and due to the directional nature of the antenna array, the location in space of an aircraft in the vicinity cannot only be sensed but also the signal strength can be measured and used as an indication of the relative distance or proximity.

FIGURE 2, which is illustrative of the transmitting system of the subject invention, includes a pulse generator 26 coupled to the transmitter section 28 which in turn is coupled to the radiating antenna 20. A power supply 27 is shown coupled to both the generator 26 and the transmitter section 28 for purposes of supplying electrical power thereto. The power supply 27 may be of any conventional design, the only requirement being that it supply the necessary voltage to the pulse generator 26 and the transmitter section 28 for proper operation. The pulse generator 26 is adapted to produce pulses having a ten microsecond pulse width at a repetition rate of one hundred pulses per second. Pulse generators of this type are well-known to those skilled in the art and the desired configuration would simply be a matter of choice to a mechanic skilled in the art. The transmitter section 28 comprises a relatively low power UHF transmitter, for example, a ten watt transmitter having a carrier frequency of fifteen hundred megacycles per second. The pulse generator coupled to the transmitter section 28 modulates the transmitter section so that ten microsecond pulses having a carrier frequency of fifteen hundred megacycles per second are transmitted at a one hundred pulse per second (p.p.s.) repetition rate. The transmitting antenna 20 is preferably a simple dipole antenna having an omnidirectional radiation pattern in the horizontal plane with a vertical beam width of approximately 90°. An additional output terminal 30 is provided at the pulse generator 26 so that a timing pulse may be coupled to the receiving system, the purposes of which will be explained subsequently.

Referring now to FIGURE 3, which is illustrative of the receiving system, there is shown schematically eight receiving antennas $24_a$, $24_b$, $24_c$ . . . $24_h$. Each antenna consists of a dipole and a suitable reflector or, when desirable, a yagi configuration. The antennas $24_a$ . . . $24_h$ are selectively mounted on the aircraft to provide a suitable array such that each antenna will be primarily responsive to a predetermined spatial region surrounding the aircraft. For example, each of the eight antennas can be positioned such that each antenna is responsive to one of eight quadrants of a sphere. For example, antenna $24_a$ would be responsive to radiation in the upper-forward-right quadrant, antenna $24_b$ would be responsive to the lower-forward-right quadrant, etc.

Coupled to each of the antennas $24_a$ . . . $24_h$ is a respective UHF receiver $34_a$ . . . $34_h$. Each of the receivers $34_a$ . . . $34_h$ includes at least an RF section 36 without automatic gain control (AGC) which is responsive to pulse signals in the UHF range such as those described with respect to the transmitter system shown in FIGURE 2. Coupled to the RF section 36 is a detector circuit 38 which is adapted to detect the amplitude of the received signal in the RF section 36 to produce a DC output signal proportional to the input signal amplitude to the RF section 36. The detector circuit 38 may be of any conventional design which produces a DC voltage which averages the amplitude of the RF input or, when desirable, the detector circuitry could take the form of a peak detector. Circuits of this type are well-known to those skilled in the art and would merely require mechanical skill to provide a specific configuration. A gate circuit 32 is included with the embodiment shown in FIGURE 3 to produce a gate signal to each RF section 36 associated with the receivers $34_a$ . . . $34_h$. The gate circuit 32, moreover, includes an input terminal 31. Coupled to the input terminal 31 is a timing signal pulse for synchronizing the gate circuit so that a sync signal is coupled to each of the RF sections 36 over circuit lead 33. The purpose of this synchronization is so that the RF section can be turned off during the periods of pulse transmission of the respective on-board transmitter system. This contemplates providing a circuit connection, not shown, between terminal 30 of the pulse generator shown in FIGURE 2 to terminal 31. The gate circuit 32 then locks the eight receivers $34_a$ . . . $34_h$ to the on-board transmitter system such that it is responsive only to receive signals during periods of non-transmission.

Coupled to each of the receivers $34_a$ . . . $34_h$ is a logic circuit 40 by means of circuit leads $39_a$ . . . $39_h$, respectively. The logic circuit 40 is coupled to an indicator 42 by means of eight circuit connections $41_a$ . . . $41_h$ and a common connection illustrated as ground. The logic system 40 is adapted to select the largest output signal from the eight receivers $34_a$ . . . $34_h$ and translate this signal to the indicator 42. The logic system contemplated is conventional being within the purview of one skilled in the art. For example, U.S. Patent 2,725,549, issued to W. J. Dunnet, discloses a circuit utilizing magnetic amplifier means for selecting the highest or lowest of a plurality of signals. This particular patent discloses what is referred to as an "auctioneering" circuit. Also U.S. Patent 2,783,457, issued to J. L. Flanagan, relates to circuitry for selecting and indicating maximum voltage of an arbitrary set of voltages. Attention is also called to U.S. Patent 2,929,047, issued to R. Rabin, which discloses a radar target classification system which includes a sensing circuit for detecting the highest figure of merit for many targets and providing an indication of same. U.S. Patent 3,149,308, issued to F. W. Lehan et al., includes a teaching of a "greatest of" detector which is comprised of semiconductor elements. Moreover, the logic system 40 translates the largest signal in the form of a pulsating signal having a repetition rate which is proportional to the DC level selected. Such a circuit could be, for example, a multivibrator whose frequency is a function of the amplitude of the applied input voltage.

The indicator 42 comprises a three dimensional display and includes visual means such as lights for each sector of space monitored by the eight antennas $24_a$ . . . $24_h$. When the logic system 40 selects the largest signal and translates it in the form of a pulse signal to the indicator 42, the light corresponding to the largest signal received at the antennas will flash at a rate proportional to the signal amplitude of DC output from the selected detector 38.

Figure 5:
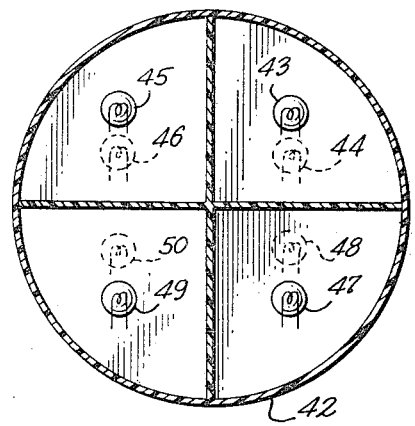
FIGURE 5 is a diagram helpful in understanding the arrangement shown in FIGURE 4.

One embodiment of the indicator 42 is shown in FIGURE 4. The configuration contemplated comprises a transparent hollow sphere which is divided into eight sectors corresponding to the eight spherical octants conforming to 0°–90°, 90°–180°, 180°–270°, 270°–360°. The indicator 42 is arranged to simulate the eight octants in space surrounding the aircraft, and in which the aircraft is imagined to be located at the center of the sphere. The system, then, would monitor the four octants forward of the aircraft and four octants at the rear of the aircraft. For example, lamp 43 would be indicative of the upper-right-forward octant whereas lamp 50 would be indicative of the lower-left-rear octant. Circuit leads $41_a$ . . . $41_h$ and the common ground lead shown in FIGURE 3 are adapted to be selectively coupled to the lamps 43, 44, 45 . . . and 50. FIGURE 5 is helpful in understanding the lamp arrangement shown in FIGURE 4 in that there is disclosed four lamps 43, 45, 49, and 47, corresponding to the upper hemisphere of the sphere 42. The lamp 43 corresponds to the upper-right-forward octant, lamp 45 corresponds to the upper-left-forward octant, lamp 49 corresponds to the upper-left-rear octant, and finally, lamp 47 corresponds to the upper-right-rear octant. Lamps 44, 46, 50 and 48 are representative of the lower hemisphere of the sphere 42.

In operation, each octant of the plastic transparent sphere 42 is monitored by a respective receiver 34 with its respective antenna 24. The logic circuit 40 determines the largest received signal and transfers it over the appropriate lead $41_a$ . . . $41_h$ to the correct spherical segment 43–50. Range or distance from the received transmitter can be indicated by intensity of illumination of the respective lamp or by a blinking lamp, with proximity indicated by rapid blinking and with greater distance being indicated by a slower blink rate. As a result, the pilot is able to detect the nearest aircraft in his area and also by intensity of the signal he sees and/or the rate of blinking thereof, the proximity of such aircraft can be immediately ascertained.

Figure 6:
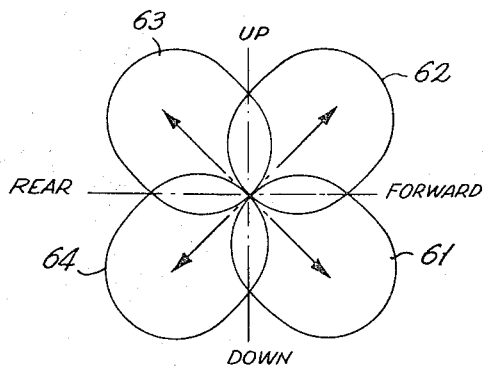
FIGURE 6 is illustrative of the antenna pattern in the vertical plane for the receiving system contemplated for use with respect to the subject invention.
Figure 7:
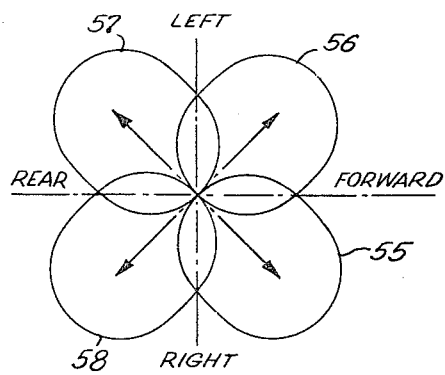
FIGURE 7 is illustrative of the antenna pattern of the receiving system noted in FIGURE 6 with respect to the horizontal plane.

FIGURES 6 and 7 are illustrative diagrams of the composite receiving antenna pattern for an aircraft utilizing the eight antenna array shown in FIGURE 3. FIGURE 6 is illustrative of the antenna pattern in the vertical plane. Four lobes 61, 62, 63 and 64 are illustrated and correspond to the upper-forward, upper-rear, lower-rear and lower-forward octants. In the horizontal plane, the antenna pattern corresponds to that illustrated in FIGURE 7. Again, four lobes 55, 56, 57 and 58 are shown illustrated and correspond to the left-forward, left-rear, right-rear, and right-forward octants. The overall antenna pattern in a three dimensional sense would occupy the eight octants of a sphere analogous to the spherical indicator 42 disclosed in FIGURE 4.

A second embodiment of the present invention is disclosed in FIGURES 8, 9 and 10. When desirable, it might be advantageous to eliminate coverage of the rear octants with a resulting configuration which only monitors the four octants in front of the aircraft. Such a configuration is contemplated because under applicable traffic rules, the aircraft in the front has the right of way over another airplane overtaking it from the rear. This being the case, coverage of the rear octants could be eliminated because the forward airplane would appear on the warning indicator of the rear airplane and the rear airplane would take the necessary corrective action to avoid any dangerous collisions.

Referring to FIGURE 8, there is shown four receiving antennas $24_a$, $24_b$, $24_c$ and $24_d$. These four antennas are adapted to receive signals from a transmitter such as shown and described with respect to FIGURE 2 and are arranged so that each will be responsive to a selected spatial zone in front of the aircraft such as a spherical octant previously described. Coupled to each antenna 24 is a respective receiver 34 such that antenna $24_a$ is coupled to receiver $34_a$, etc. The receiver 34 is identical to the receiver employed in the embodiment shown in FIGURE 3. Coupled to each of the four receivers $34_a \ldots 34_d$ is a gate circuit 32 having a terminal 31 which is adapted to receive a timing pulse from the transmitter for keeping the respective receivers off during the transmittal period of the on-board transmitter. Coupled from each receiver $34_a \ldots 34_d$ is an output lead $39_a \ldots 39_d$ which feeds into a logic circuit 40. The output of the logic circuit 40 is coupled to four output terminals $70_a$, $70_b$, $70_c$ and $70_d$ by means of the leads $41_a \ldots 41_d$, respectively. The terminals $70_a$, $70_b$, $70_c$ and $70_d$ are adapted to be connected to an indicator not shown.

An indicator suitable for coupling to the embodiment shown in FIGURE 8 is disclosed in FIGURE 9. A transparent hemispherical configuration divided into four spherical sectors corresponding to the octants previously described and referred to hereinafter as octants is shown with lamps 43, 44, 45 and 46 located in a respective sector. This is shown in a sectional view at FIGURE 10. The lamp 43 is located in the upper-right-forward octant while the lamp 45 is located in the upper-left-forward octant. Likewise, lamps 44 and 46 are located in the lower-right-forward and lower-left-forward octants, respectively. The operation of the embodiment shown in FIGURE 8 is in all respects like the operation of the embodiment shown in FIGURE 3 with the exception that the forward coverage is solely considered. The logic circuitry 40 again translates the strongest signal received at the antennas $24_a \ldots 24_d$ and detected in the receivers $34_a \ldots 34_d$ with the appropriate lamp 43 . . . 46 being illuminated according to the point in space from which the strongest signal was received. Also, the proximity or range can be indicated by the intensity of the illumination or by providing for a blink rate which is a function of the distance from the transmitting aircraft.

What has been shown and described, therefore, is an aircraft location and course instrument to detect the location of a nearby aircraft and the general course of such aircraft utilizing an indicator comprised of a transparent sphere divided into sections, each having a light source whose intensity or rate of blinking is varied as the function of the proximity of the nearby aircraft.

It is to be understood that the forms of the invention herewith shown and described are to be taken as preferred examples of the same, and that various changes in the shape, size and arrangement of parts may be resorted to, without departing from the spirit of the invention or scope of the subjoined claims.

Having thus described my invention, I claim:
1. A collision avoidance system for aircraft and the like comprising in combination: a UHF transmitter system located on said aircraft including omnidirectional radiating means for radiating a pulse signal of a predetermined pulse width and repetition rate on a UHF carrier to other aircraft; a receiver system located on said aircraft being responsive to said pulse signal radiated from said other aircraft and comprising a plurality of antennas each having a substantially fan-shaped radiation pattern and located on said aircraft so as to provide an array which will be directionally responsive, a UHF receiver coupled to each of said plurality of antennas, said receiver including an RF section and a detector for demodulating said UHF pulses and providing a DC signal in accordance with the received signal strength thereof, gating means coupled to each receiver and being synchronized with said transmitter means located on the respective aircraft for rendering said receiver means inoperative during the transmission period of said UHF pulse signal and onboard said UHF transmitter system; a logic circuit coupled to each said UHF receiver for determining the magnitude of the largest DC signal and providing a pulsing output signal whose repetition rate is proportional to said largest DC signal; and a three dimensional indicator means coupled to said logic circuit, said indicator means comprising a transparent substantially hollow spherical body equally divided into a plurality of equal sectors simulating corresponding sectors in space surrounding said aircraft and a single stationary indicator light mounted at substantially the center of each of said plurality of equal sectors and operated by said pulsing output signal from said logic circuit for providing a visual indication of the location, course, and range of the nearest aircraft by the intensity and/or rate of blinking of a predetermined indicator light.

2. The apparatus as defined in claim 1 wherein said substantially hollow spherical body comprises a sphere divided into eight equal sectors or octants.

3. The apparatus as defined in claim 1 wherein said substantially hollow spherical body comprises a hemisphere divided into four equal sectors or quadrants.

References Cited
UNITED STATES PATENTS
| | | |
|---|---|---|
| 2,457,199 | 12/1948 | Best. |
| 2,560,265 | 7/1951 | Adler _____ 343—112 |
| 2,571,368 | 10/1951 | Kahn et al. |
| 2,605,393 | 7/1952 | Holm. |
| 2,749,480 | 6/1956 | Ruderfer. |
| 2,939,135 | 5/1960 | Beckerich et al. |

FOREIGN PATENTS
| | | |
|---|---|---|
| 724,604 | 7/1942 | Germany. |

RODNEY D. BENNETT, *Primary Examiner.*
CHESTER L. JUSTUS, *Examiner.*
T. H. TUBBESING, *Assistant Examiner.*